(12) United States Patent
Fogelin et al.

(10) Patent No.: US 9,480,279 B2
(45) Date of Patent: Nov. 1, 2016

(54) SYSTEM AND METHOD FOR STRAINING A BEVERAGE

(71) Applicant: ErJo Designs, LLC, Freeland, WA (US)

(72) Inventors: Jodi M. Fogelin, Freeland, WA (US); Eric Fogelin, Freeland, WA (US)

(73) Assignee: ERJO DESIGNS, LLC, Freeland, WA (US)

(*) Notice: Subject to any disclaimer, the term of this patent is extended or adjusted under 35 U.S.C. 154(b) by 0 days.

(21) Appl. No.: 14/561,638

(22) Filed: Dec. 5, 2014

(65) Prior Publication Data

US 2015/0157049 A1 Jun. 11, 2015

Related U.S. Application Data

(60) Provisional application No. 61/913,069, filed on Dec. 6, 2013.

(51) Int. Cl.
| | | |
|---|---|---|
| *B01D 33/01* | (2006.01) | |
| *A47J 31/20* | (2006.01) | |
| *A47J 31/06* | (2006.01) | |
| *A23L 2/72* | (2006.01) | |
| *B01D 33/46* | (2006.01) | |
| *A47J 31/18* | (2006.01) | |

(52) U.S. Cl.
CPC .......... *A23L 2/72* (2013.01); *A47J 31/06* (2013.01); *B01D 33/015* (2013.01); *A47J 31/0626* (2013.01); *A47J 31/18* (2013.01); *A47J 31/20* (2013.01); *B01D 33/0158* (2013.01); *B01D 33/0183* (2013.01); *B01D 33/46* (2013.01); *B01D 33/466* (2013.01)

(58) Field of Classification Search
CPC ........................................................ A23L 2/72
See application file for complete search history.

(56) References Cited

U.S. PATENT DOCUMENTS

| | | | | |
|---|---|---|---|---|
| 625,131 | A * | 5/1899 | Abbott | B01D 29/118 |
| | | | | 210/414 |
| 2,053,021 | A | 9/1936 | Cassol | |
| 2,211,486 | A | 8/1940 | Zoia | |
| 2,459,498 | A | 1/1949 | Cameron | |
| 2,900,896 | A | 8/1959 | Bondanini | |
| 2,901,763 | A * | 9/1959 | Jalkanen | D21G 9/00 |
| | | | | 15/246.5 |
| 4,650,583 | A * | 3/1987 | Bondanini | A47J 31/20 |
| | | | | 210/474 |
| 7,040,218 | B1 | 5/2006 | Biolchini, Jr. | |
| 8,313,644 | B2 * | 11/2012 | Harris | C02F 1/002 |
| | | | | 210/198.1 |
| 2009/0236341 | A1* | 9/2009 | McKinney | A47G 19/2266 |
| | | | | 220/375 |
| 2011/0014340 | A1* | 1/2011 | Spitzley | A47J 31/20 |
| | | | | 426/433 |
| 2012/0097042 | A1* | 4/2012 | Lin | A47J 31/20 |
| | | | | 99/297 |

FOREIGN PATENT DOCUMENTS

| | | | |
|---|---|---|---|
| WO | WO 99/07266 A1 * | 2/1999 | |
| WO | WO 00/27261 | 5/2000 | |
| WO | WO 2009/149568 A1 * | 12/2009 | |

\* cited by examiner

*Primary Examiner* — Thomas M Lithgow
(74) *Attorney, Agent, or Firm* — Davis Wright Tremaine LLP

(57) ABSTRACT

A system for beverage preparation, and methods for manufacturing and using same. The system includes a container defining a container cavity having a cavity top and bottom end and a plunger assembly configured to translate within the container cavity between the cavity top and bottom end. The plunger assembly can include a shaft having a shaft top and bottom end, a straining body disposed at the shaft bottom end and having a strainer top and bottom end and a strainer bottom surface, and a scraper assembly rotatably coupled about the strainer bottom end and configured to rotatably scrape the strainer bottom surface.

14 Claims, 11 Drawing Sheets

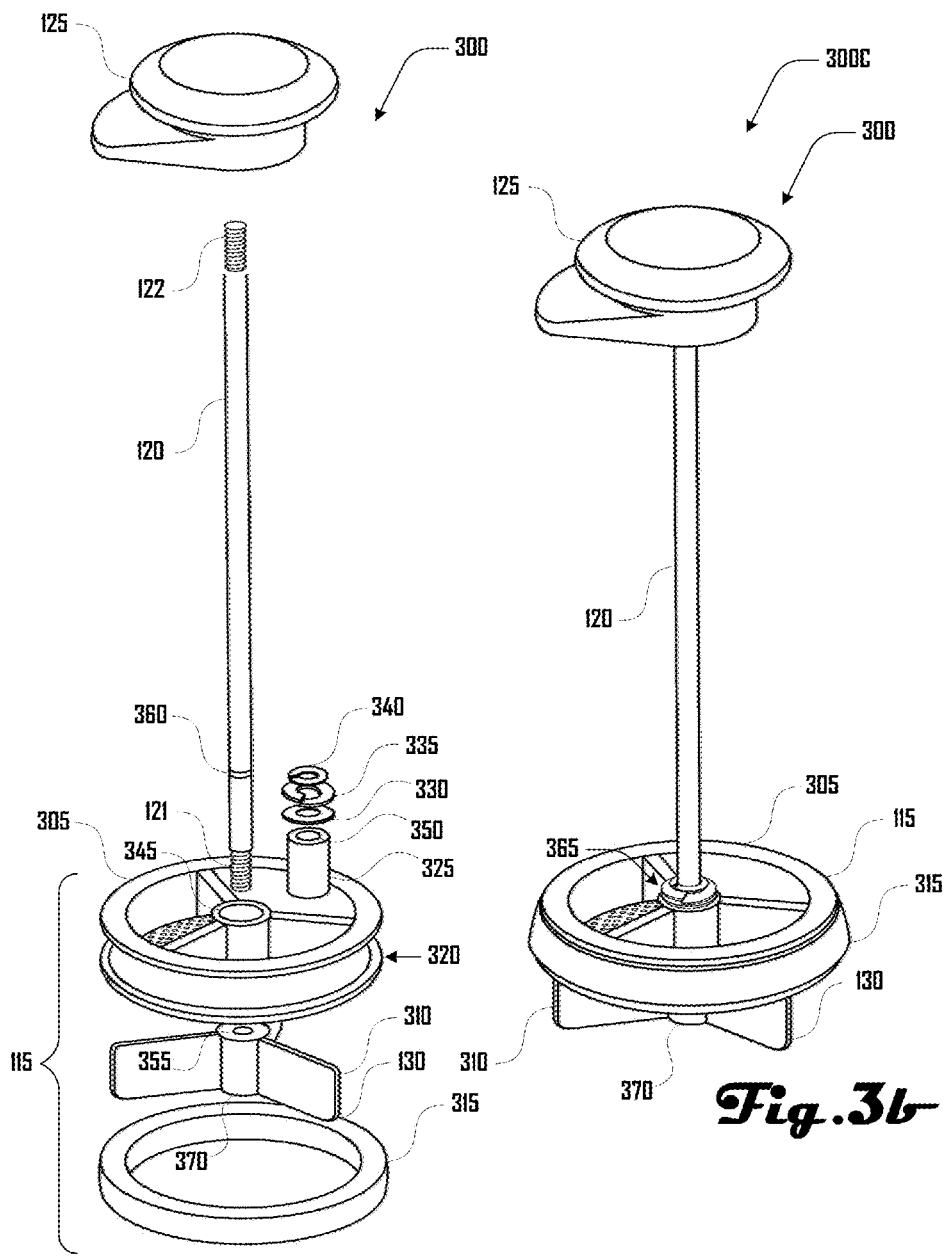

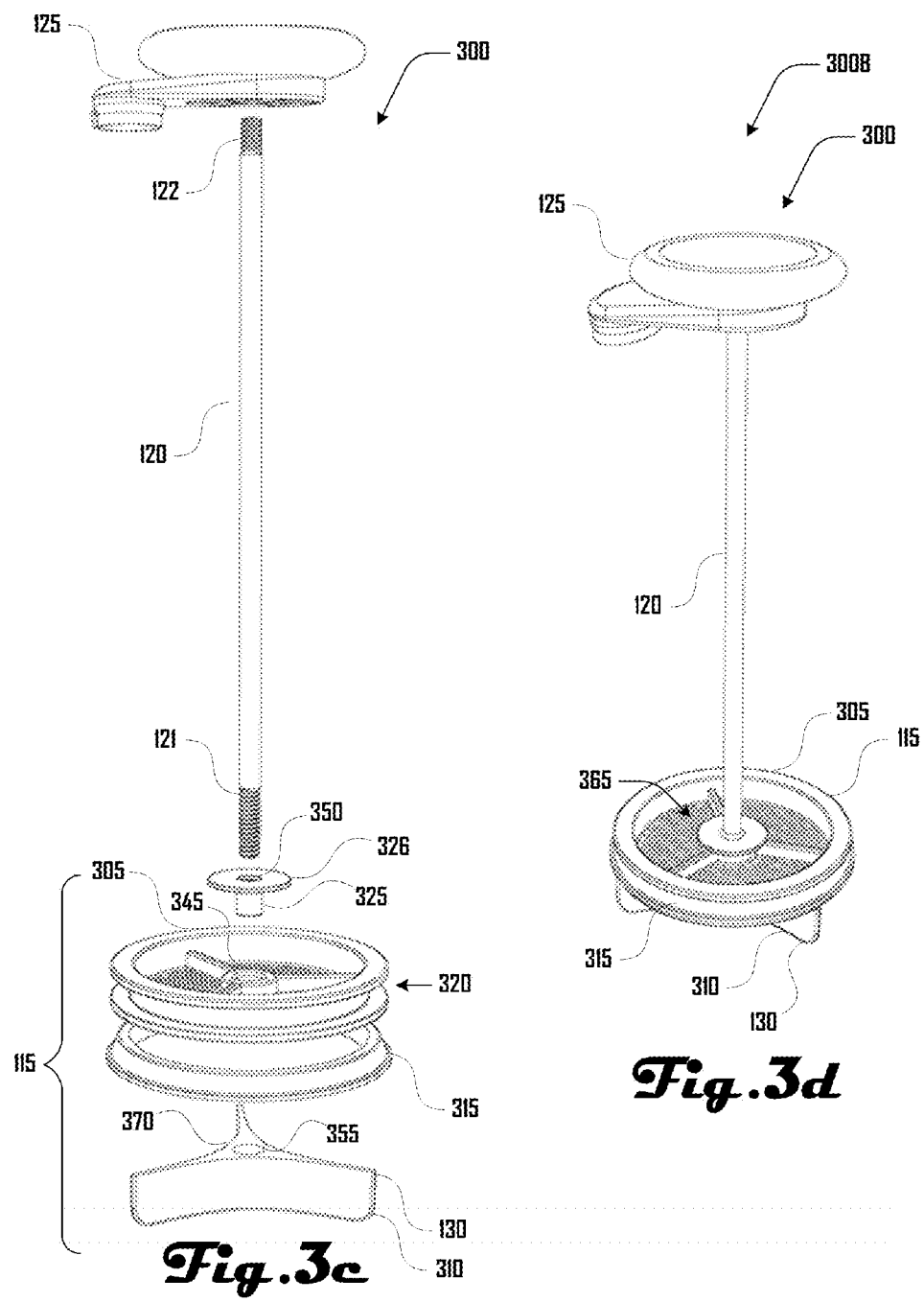

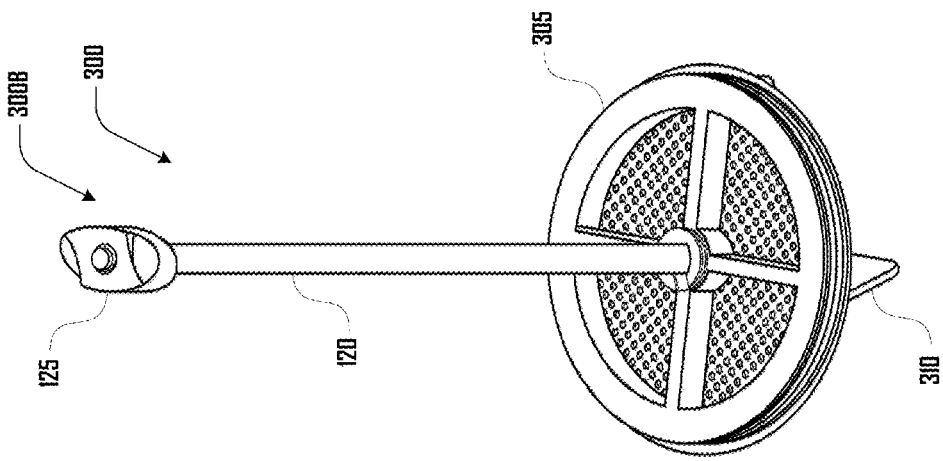
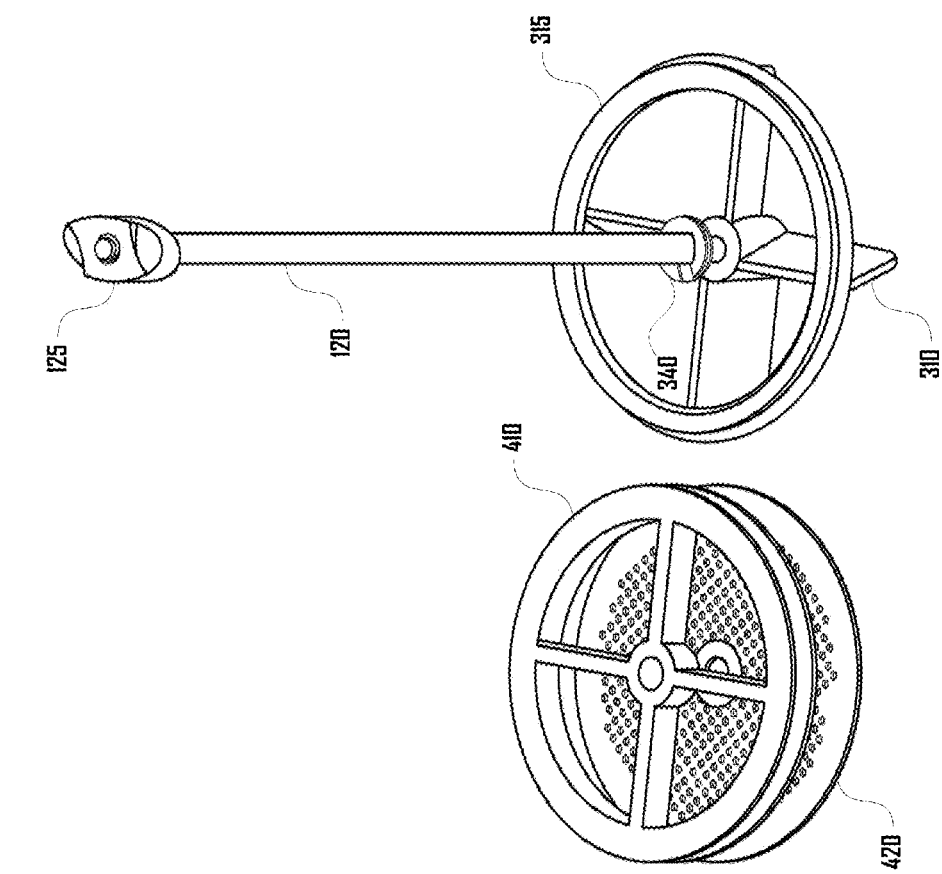

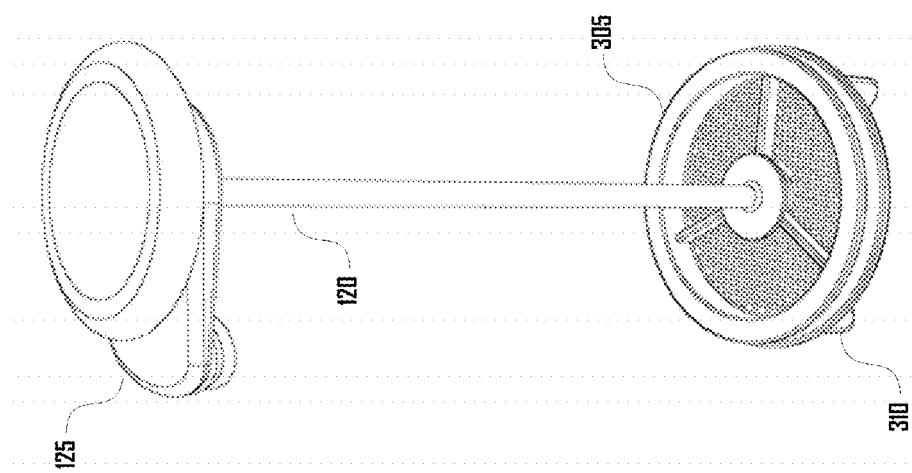
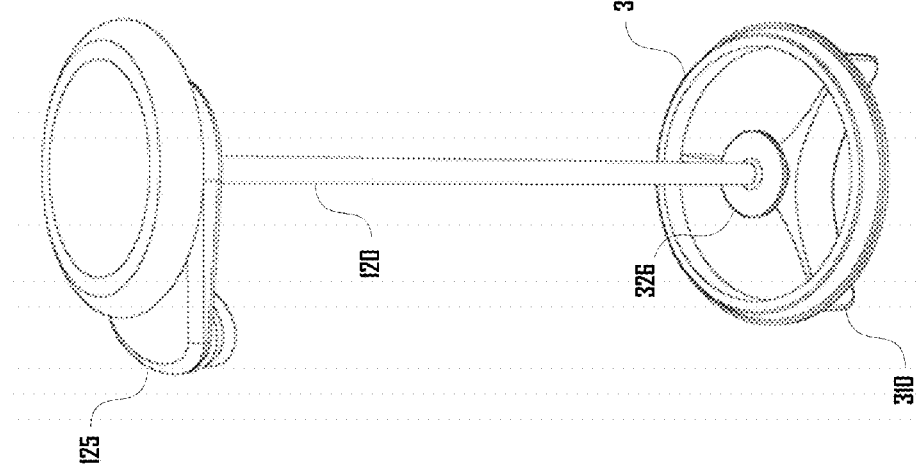

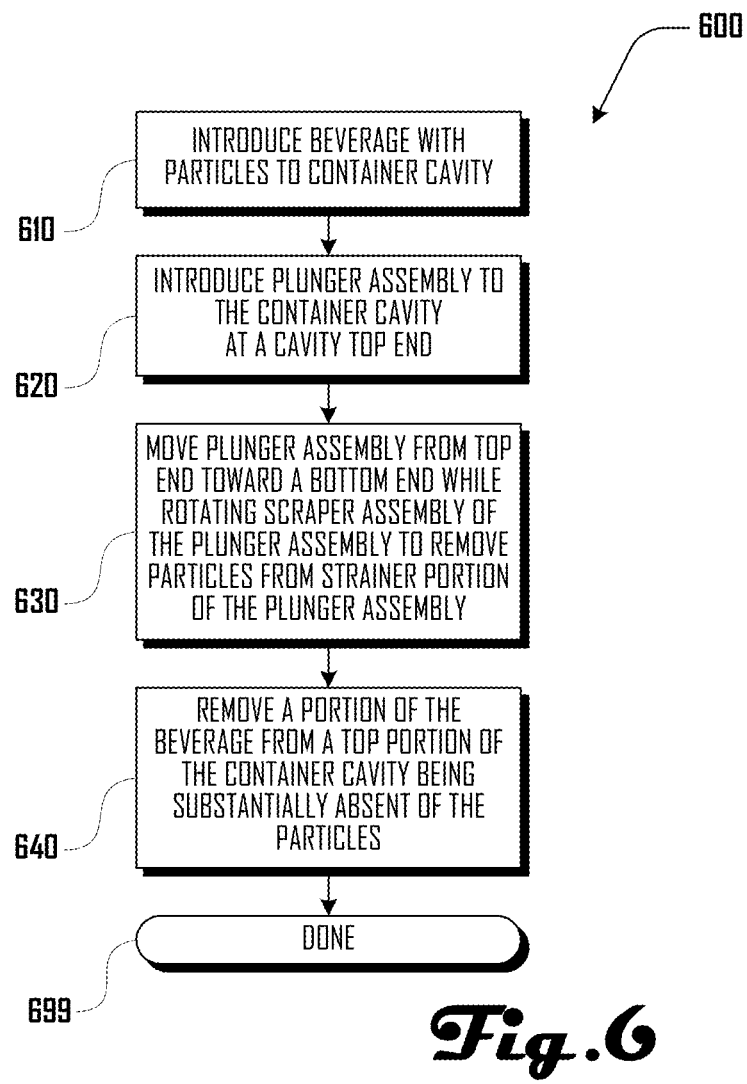

SYSTEM AND METHOD FOR STRAINING A BEVERAGE

CROSS-REFERENCE TO RELATED APPLICATIONS

This application is a non-provisional of and claims the benefit of U.S. Provisional Application No. 61/913,069, filed Dec. 6, 2013, which application is hereby incorporated herein by reference in its entirety for all purposes.

BACKGROUND

Straining devices exist in the art for preparing beverages. For example, existing patents teach variations and improvements on the French press coffee maker. U.S. Pat. No. 2,053,021 to B. Cassol; U.S. Pat. No. 2,211,486 to H. G. Zoia; and U.S. Pat. No. 2,900,896 to F. Bondanini each teach a pot for making coffee where ground coffee beans are introduced into the pot along with hot water and a plunger that is used to strain the resulting coffee extraction mixture. The used grounds are pushed to the bottom of the pot and coffee that is free of grounds remains at the top of the pot where it can be accessed by a user.

As an improvement to the conventional French press, some inventors teach adding a stirring assembly at the bottom of the plunger, which allows the coffee grounds to be mechanically stirred within the water to improve extraction. For example, U.S. Pat. No. 2,459,498 to R. T. Cameron, U.S. Pat. No. 7,040,218 to Biolchini, and French Patent Publication WO 00/27261 by Dominguez each teach paddles that spin below the bottom of a plunger to stir a mixture of coffee grounds and water (the paddles do not contact the bottom of the plunger).

Although these inventions provide for fast preparation extractions and mixed beverages, they remain deficient and unacceptable for many applications. For example, each of the disclosures discussed above teaches a plunger that is configured to strain solid particles such as coffee grounds from liquid. The plunger creates a barrier that prevents solid particles of a defined size from passing through the strainer and thereby confines solid particles to the bottom of the pot. Particles are caught by the strainer but allow liquid to flow through the strainer. However, the strainer becomes clogged as particles accumulate against the bottom of the strainer and the user is eventually unable to depress the plunger any further because fluid can no longer pass through the strainer.

Clogging of the strainer creates an undesirable user experience because many mixed liquids are unable to be strained, even after multiple attempts. Such clogging can occur when straining extractions such as coffee, tea or the like and may occur when straining other mixed beverages including fruit smoothies containing seeds and skins. In view of the foregoing, a need exists for an improved beverage strainer in an effort to overcome the aforementioned obstacles and deficiencies of conventional beverage strainers.

BRIEF DESCRIPTION OF THE DRAWINGS

FIG. 3a is an exemplary exploded side view illustrating an embodiment of a plunger apparatus.

FIG. 3b is an exemplary side view illustrating the embodiment of the plunger apparatus of FIG. 3a.

FIG. 3c is an exemplary exploded side view illustrating another embodiment of a plunger apparatus.

FIG. 3d is an exemplary side view illustrating the embodiment of the plunger apparatus of FIG. 3c.

FIG. 4a is an exploded perspective view of a strainer and plunger body in accordance with an embodiment.

FIG. 4b is a perspective view of a shaft, paddle assembly, and gasket in accordance with an embodiment.

FIG. 4c is a perspective view of a plunger in accordance with the embodiments of FIGS. 4a and 4b.

FIG. 4d is an exploded perspective view of a strainer and plunger body in accordance with another embodiment.

FIG. 4e is a perspective view of a shaft, paddle assembly, and gasket in accordance with an embodiment.

FIG. 4f is a perspective view of a plunger in accordance with the embodiments of FIGS. 4d and 4e.

FIG. 5b is a bottom perspective view of the plunger body in accordance with the embodiment of FIG. 5a.

FIG. 6 is a block diagram of a method for straining a beverage comprising particles in accordance with an embodiment.

Figure 1A:
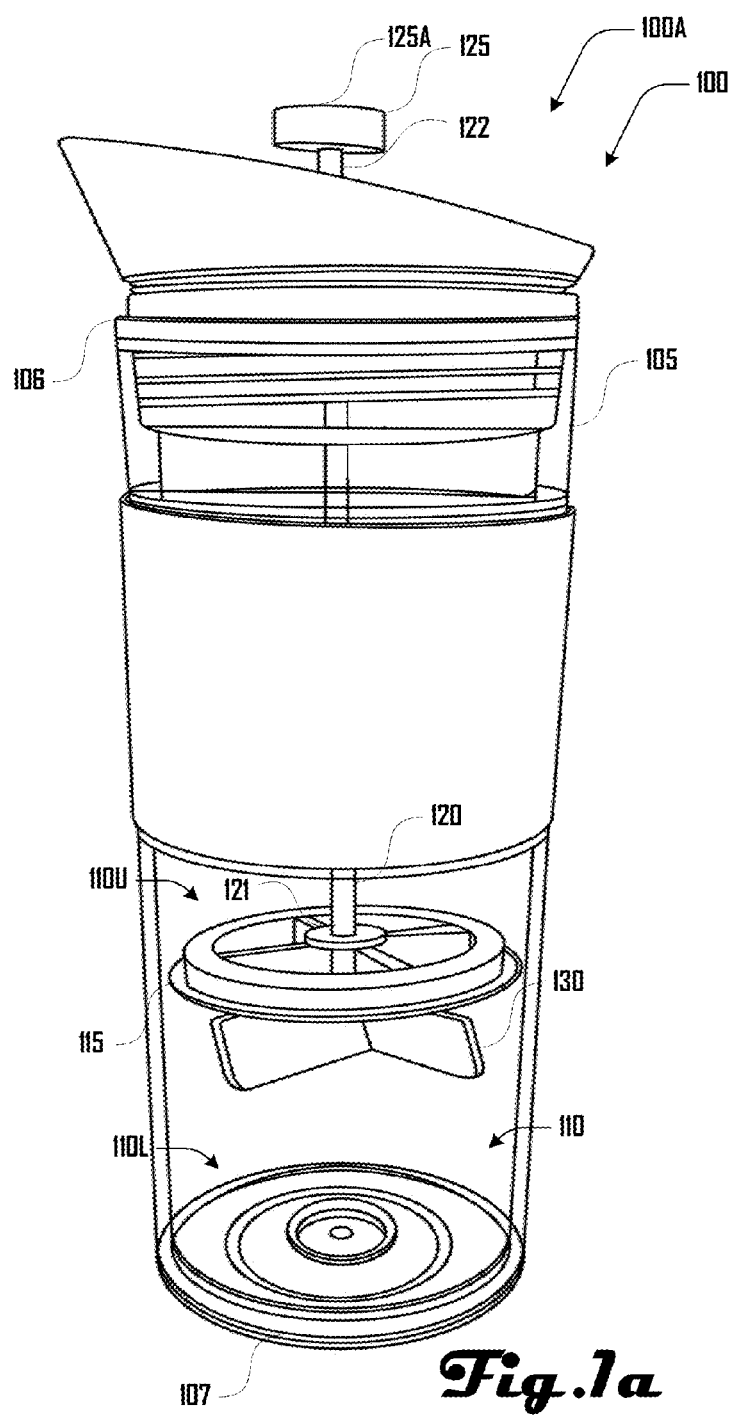
FIG. 1a is an exemplary side view illustrating an embodiment of a beverage strainer.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available beverage strainers are deficient because they become clogged with particles and prevent straining, a beverage strainer that scrapes a straining plunger can prove desirable and provide a basis for a wide range of applications, including straining mixtures such as smoothies and the like. This result can be achieved, according to one embodiment disclosed herein, by a beverage strainer 100 as illustrated in FIG. 1a.

FIG. 1a is an exemplary side view illustrating an embodiment 100A of a beverage strainer 100 that comprises a container body 105 having a container top end and bottom end 106, 107. The container body 105 defines a container cavity 110 that extends from the top end to bottom end 106, 107.

A plunger body 115 is configured to reside within the cavity 110 and translate between the top and bottom ends 106, 107. The plunger body 115 is configured to separate the cavity 110 into a cavity upper portion 110U and a cavity lower portion 110L. The upper and lower portions 110U, 110L may change size as the plunger body 115 translates within the cavity 110. The plunger body 115 is coupled to a shaft 120 that includes a knob 125 at a shaft top end 121 and the plunger body 115 further comprises a scraper assembly 130 coupled with the shaft 120 at a shaft bottom end 122.

Figure 1B:
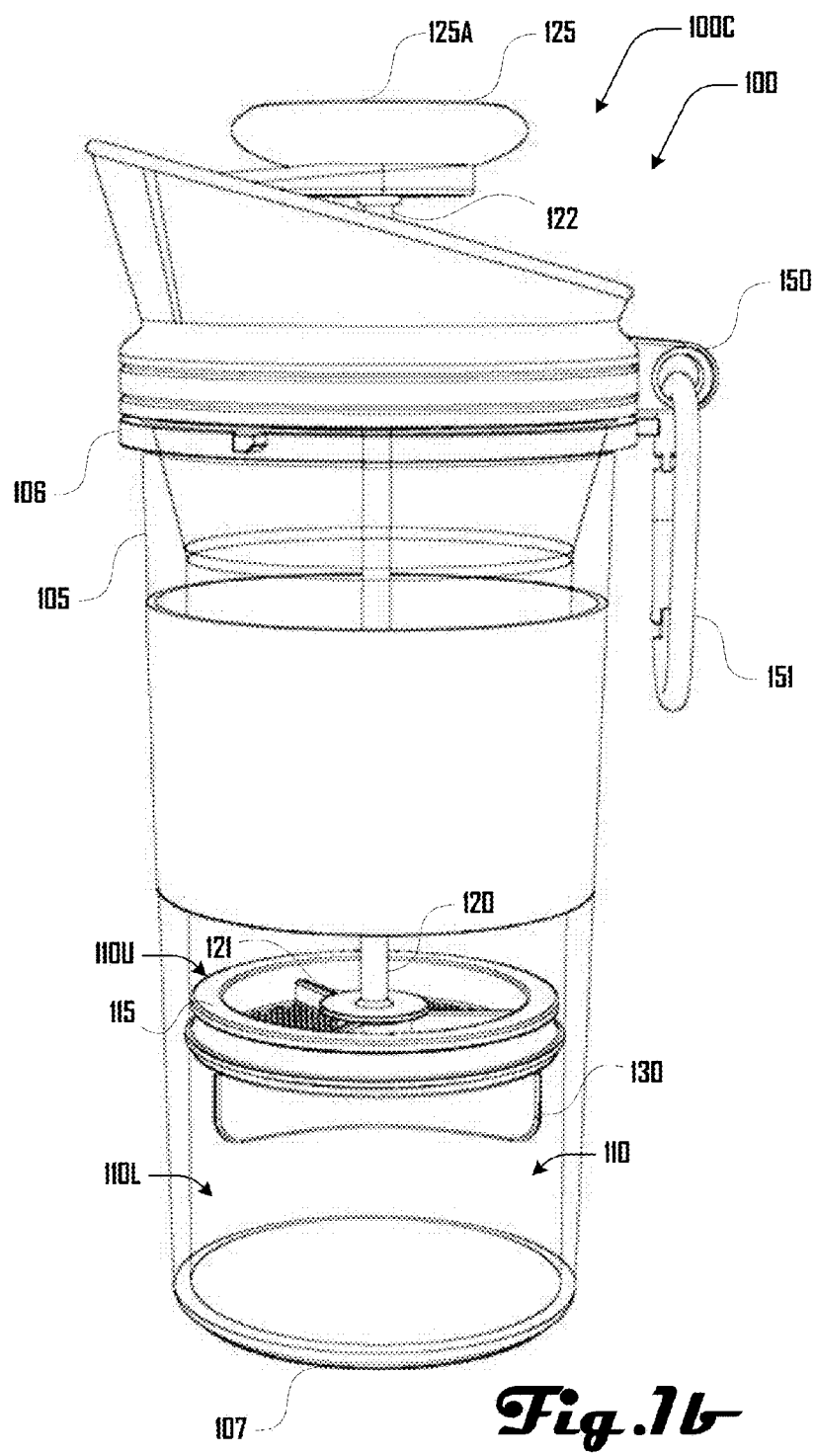
FIG. 1b is an exemplary side view illustrating another embodiment of a beverage strainer.

In some embodiments, for example as depicted in the embodiment 100C of FIG. 1b, the beverage strainer 100 can comprise a loop 150 that is operable to couple with a carabiner 151, or the like. The loop 150 can be coupled to any suitable portion of the container body 105.

Figure 2A:
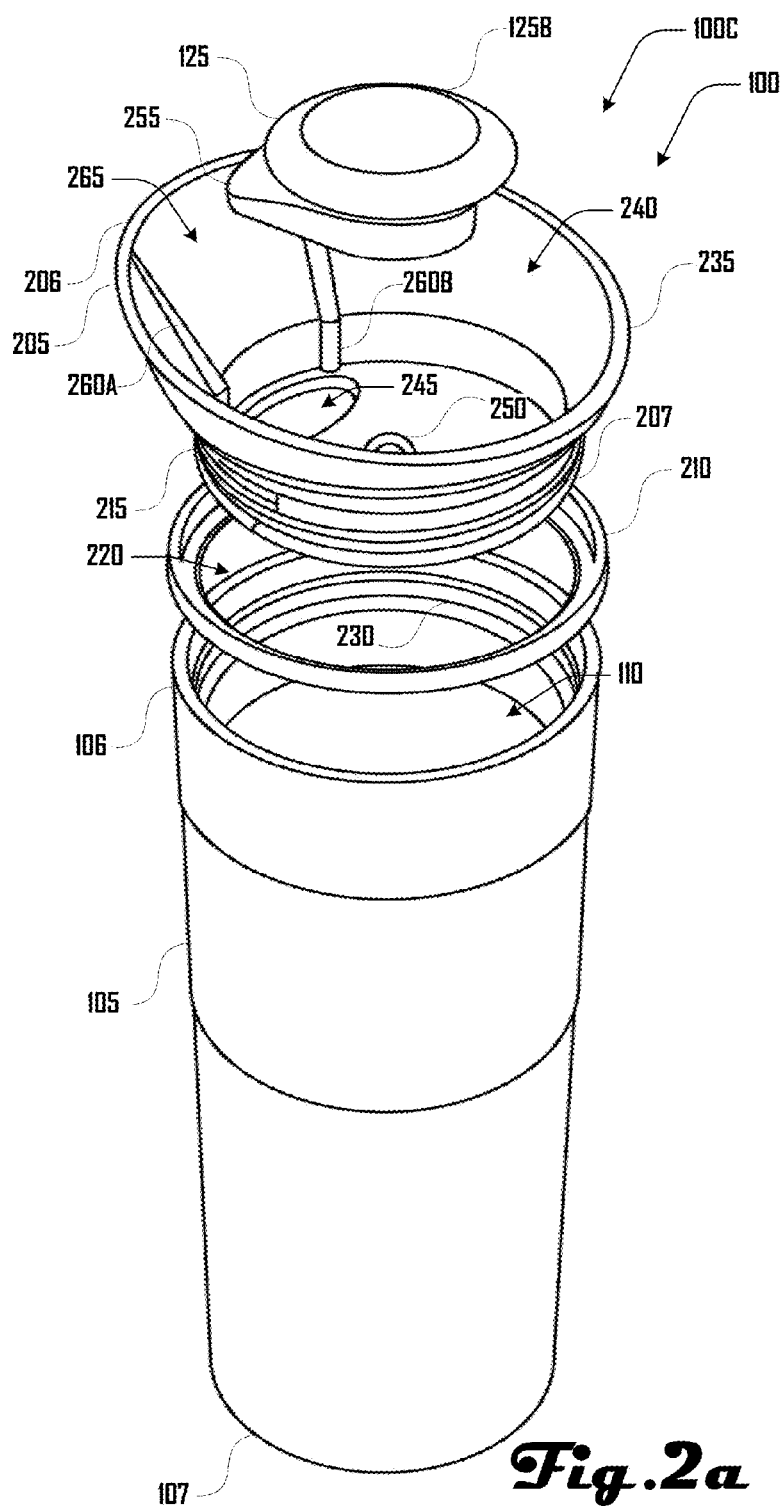
FIG. 2a is an exemplary exploded view illustrating a further embodiment of a beverage strainer.

FIG. 2a is an exemplary exploded view illustrating another embodiment 100B of a beverage strainer 100 that includes a container body 105 having a top and bottom end 106, 107. The container body 105 defines a cavity 110.

The beverage strainer 100 comprises a lid 205 that includes a lid top and bottom end 206, 207. The lid 205 extends through a lid gasket 210 through a gasket cavity 220 and couples with the container top end 106 via lid threads 215 on the lid bottom end 207 and engages container threads 230 at the container top end 106. The lid gasket 210 resides between the lid 205 and container body 105 to provide a seal between the lid 205 and container body 105.

The lid 205 comprises a rim 235 that defines a lid cavity 240. A lid orifice 245 is defined by a portion of the lid bottom end 207 and provides a passage from the container cavity 110 to the lid cavity 240. The lid 205 further defines a shaft passage 250 through which a shaft 120 (Shown in FIGS. 1a and 1b), may extend and translate. The rim 235 defines a pair of banks 260A, 260B that define a fluid channel 265 along a portion of the rim 235.

As described in more detail herein, a user may drink a strained beverage from the container 105, by pouring the beverage out of the lid orifice 245. In some embodiments, the banks 260A, 260B may control the flow of the beverage out of the container 105. In some embodiments, the knob 125 may comprise a lid orifice cover 255 that is configured to cover the lid orifice 245. This may be desirable in various embodiments, because the cover 255 may prevent the beverage from spilling out of the lid orifice 245.

Figure 2B:
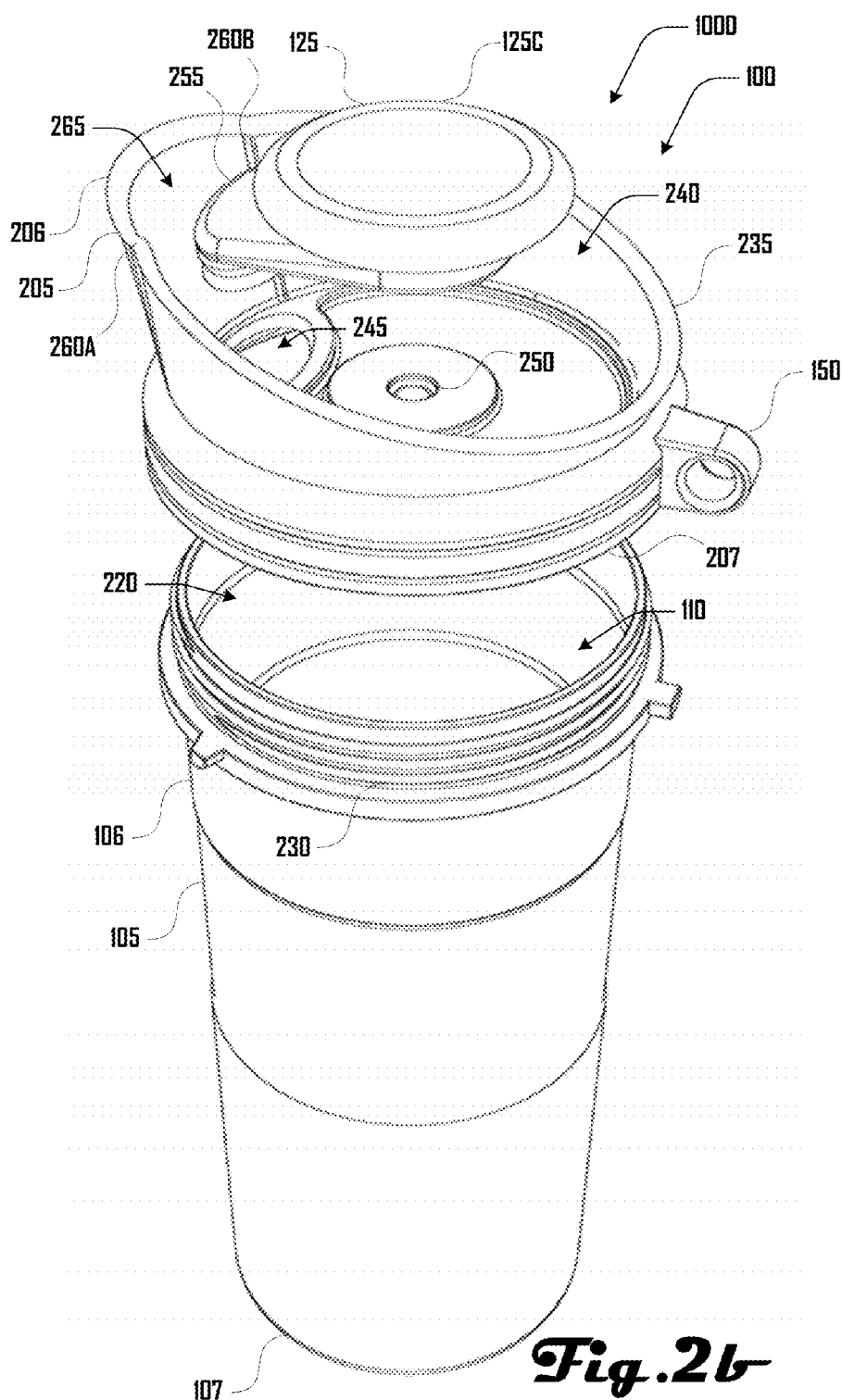
FIG. 2b is an exemplary exploded view illustrating the embodiment of the beverage strainer of FIG. 1b.

FIG. 2b is an exemplary exploded view illustrating the embodiment 100C of the beverage strainer of FIG. 1b. As shown in FIG. 2b, the lid 205 can comprise a loop 105 coupled proximate to the lid bottom end 207. Additionally, while FIG. 2a illustrates an embodiment 100C, wherein the container threads 230 are positioned on an internal portion of the top end 106 of the container body, in the embodiment 100C shown in FIG. 2b, the container threads 230 can be positioned on an external portion of the top end 106 of the container body 105. Accordingly, complementary threads (not shown in FIG. 2b) can be disposed on an internal portion of the lid 205 in various embodiments, including the embodiment 100C shown in FIG. 2b. As further shown in FIG. 2b, in various embodiments, the lid gasket 210 (shown in FIG. 2a) can be absent.

FIGS. 3a and 3b illustrate an embodiment 300A of a plunger assembly 300 that comprises the plunger body 115, shaft 120, knob 125, and scraper assembly 130. In the embodiment 300A of FIGS. 3a and 3b, the plunger body 115 comprises a strainer body 305 and a plunger gasket 315 that resides within a gasket seat 320 defined by the strainer body 305. The plunger assembly 300 further comprises a bearing 325, a washer 330, a tensioner 335, and a retainer 340. The bearing 325 resides within a bearing slot 345, and the shaft bottom end 121 extends through a bearing passage 350 defined by the bearing 325 and couples with the scraper assembly 130 at a hub coupling 355 via complementary threads. The washer 330 resides over the bearing 325, the tensioner 335 resides over the washer 330 and the retainer 340 couples with the shaft 120 via a retainer notch 360 to collectively define an axle assembly 365 defined by the bearing 325, washer 330, tensioner 335, and retainer 340 collectively.

In various embodiments, the scraper assembly 130 may comprise one or more blades 310. For example, FIGS. 3a, 3b, 5a and 5b depict a scraper assembly 130 comprising three blades 310A, 310B, 310C that extend radially from a hub 370. However, in some embodiments, any suitable number of blades 310 may comprise a scraper assembly 130 (e.g., four blades 310 as depicted in FIGS. 4b and 4c).

Additionally, blades 310 may extend from the hub 370 at any desirable angle. For example, as shown in FIGS. 3a, 3b, 5a and 5b, blades may be substantially perpendicular to the bottom of the strainer body 305 or substantially parallel to the shaft 120. However, in some embodiments the blades 310 may be disposed at another suitable angle relative to the shaft 120 or strainer body 305. For example, as depicted in FIGS. 4b and 4c, the blades 310 may be disposed substantially non-perpendicular compared to the strainer body 305 and substantially non-parallel to the shaft 120, which may include acute or obtuse angles, or the like. In further embodiments, one or more of the blades 310 may have a different angle compared to another one of the blades 310.

In further embodiments, the plunger assembly 300 may be in any other suitable form or configuration, and may comprise any suitable additional parts or fewer parts, and such parts may be present in singular or any suitable plurality in various embodiments. For example, FIGS. 3c and 3d illustrate another embodiment 300C of a plunger assembly 300. As shown in FIG. 3c, the bearing 325 comprises a rim 326 and resides within the bearing slot 345 with the rim 326 disposed over the bearing slot 345. As discussed above, the shaft bottom end 121 extends through the bearing passage 350 defined by the bearing 325 and couples with the scraper assembly 130 at a hub coupling 355 via complementary threads.

In some embodiments, various parts may be combined or be defined by a plurality of parts. For example, as depicted in FIGS. 4a and 4c, the strainer body 305 may comprise a strainer support 410 and strainer plate 420 that are separate pieces. In contrast, as depicted in FIGS. 3a, 3b, 4d, 4e, 4f, 5a and 5b, the strainer body 305 can be a single piece. Accordingly, the embodiments of a plunger assembly 300 should not be construed to be limiting, and are merely some example embodiments that are within the scope and spirit of the present invention.

Figure 5A:
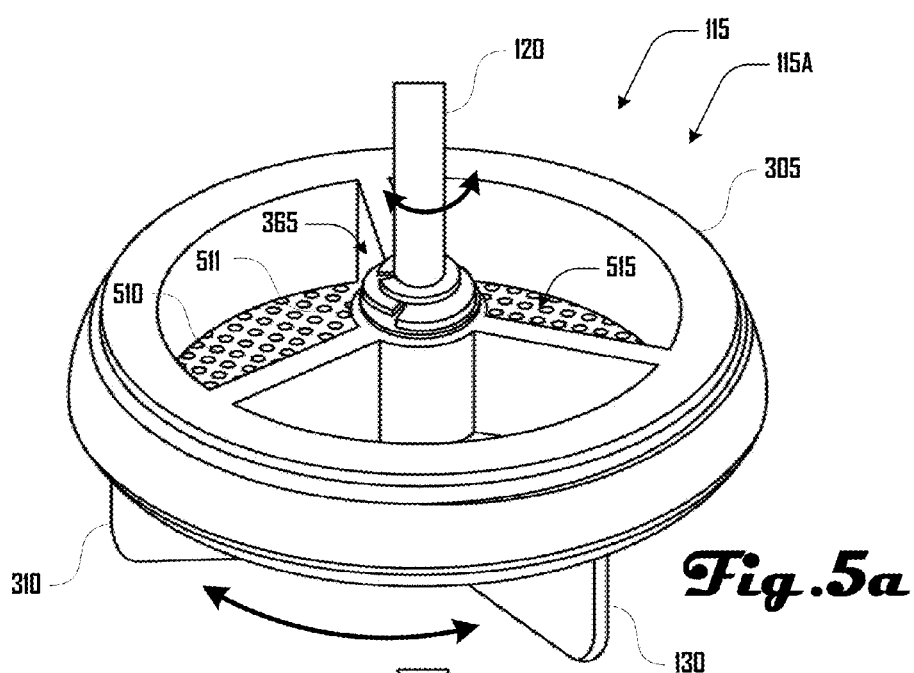
FIG. 5a is a top perspective view of a plunger body in accordance with an embodiment.
Figure 5B:
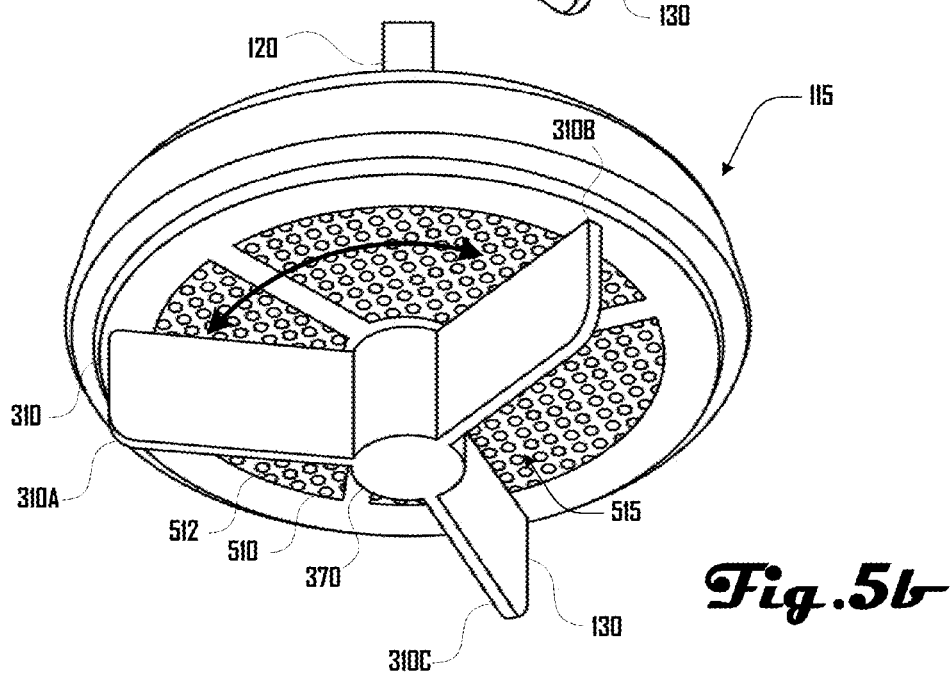
Figure 5C:
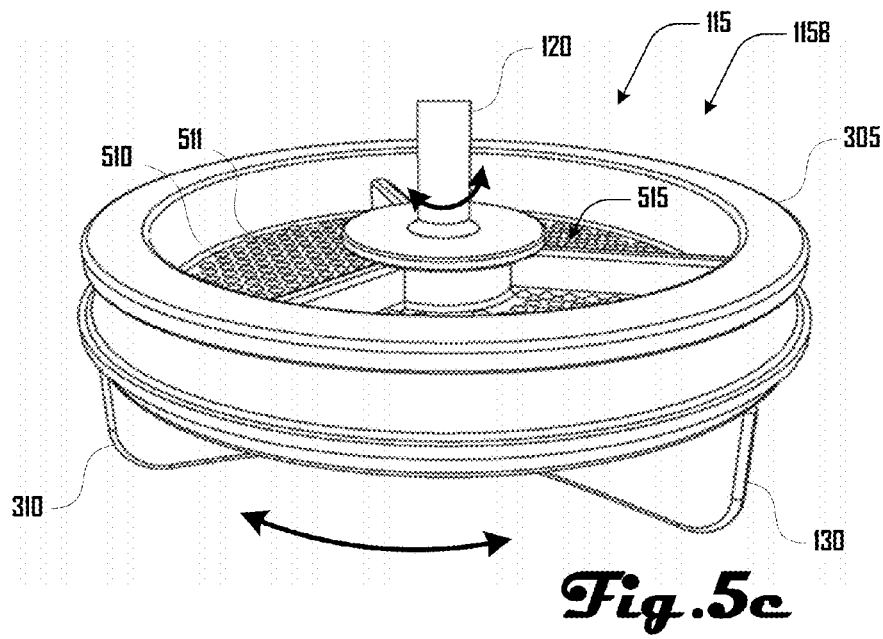
FIG. 5c is a top perspective view of a plunger body in accordance with another embodiment.
Figure 5D:
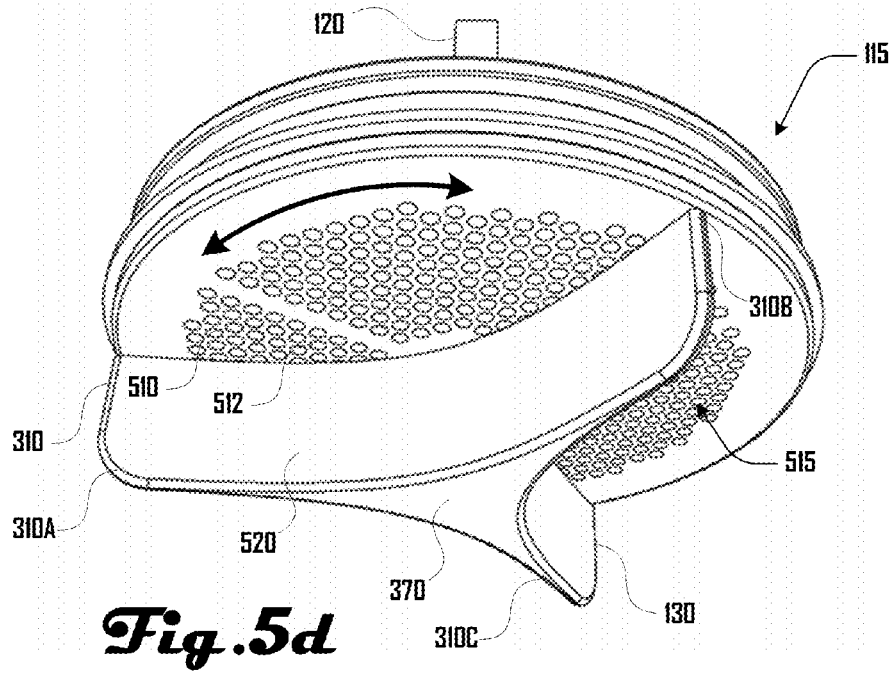
FIG. 5d is a bottom perspective view of the plunger body in accordance with the embodiment of FIG. 5c.

FIGS. 5a and 5b are top and bottom perspective views of a plunger body 115 in accordance with an embodiment. As discussed herein, the scraper assembly 130 may comprise a plurality of blades 310 that extend from a central hub 370. For example, as illustrated in FIGS. 5a and 5b, the example embodiment 115A includes three blades 310A, 310B, 310C that extend from the hub 370. The blades 310A, 310B, 310C are shown as being substantially planar and extending from a circular hub 370. In contrast, as shown in FIGS. 5c and 5c, in another embodiment 115B, the blades 310A, 310B, 310C can be wider near the hub 307 than at ends of of the blades 310. Accordingly, pairs of blades 310 can define a plurality of curved faces 520 with the scraper assembly 130 having a concave triangular shape.

The strainer body 305 may comprise a strainer portion 510 that includes a top and bottom surface 511, 512 and that defines a plurality of strainer holes 515 that extend between the top and bottom surfaces 511, 512. While strainer portion 510 is shown as a solid piece with a plurality of holes 515 in this embodiment, in further embodiments, the strainer portion 510 and holes 515 may be defined and embodied in any suitable way. For example, the strainer portion 510 may comprise a metal mesh or may comprise a fabric, plastic or the like. The strainer portion 510 may comprise any suitable material.

The scraper assembly 130 may be rotatably coupled proximate to the bottom surface 512 of the strainer portion 510, and be configured to rotate in any of a clockwise or counter-clockwise manner. In various embodiments, the scraper assembly 130 may be rotated by rotating the shaft 120.

As described in further detail herein, the plunger body 115 may be used to strain particles present in a liquid. For example, FIG. 6 is a block diagram of a method 600 for straining a beverage comprising particles in accordance with an embodiment. The method begins in block 610 where a beverage with particles is introduced into the container cavity 110 (FIGS. 1 and 2). The plunger assembly 115 is introduced into the container cavity 110 at the cavity top end 106, at block 620. In block 630, the plunger assembly 115 is moved from the top end 106 toward the bottom end 107 of the cavity 110 while rotating the scraper assembly 130 to remove or dislodge particles from the strainer portion 510.

For example, depending on the volume of the beverage introduced to the cavity 110 and the volume of the cavity 110, the beverage may only occupy a portion of the cavity 110, and therefore when the plunger assembly 115 is introduced to the cavity 110, it can move toward the bottom end 107 along a portion of the cavity 110 without contacting the beverage. However, when the plunger assembly 115 reaches the beverage volume, the scraper assembly 130 and bottom end 511 may contact the beverage and continued movement of the plunger assembly 115 toward the bottom end 107 may force a portion of the beverage through the holes 515 of the strainer portion 510.

In various embodiments, the holes 515 of the strainer portion 510 may be any suitable size and may be of any suitable number. The size of the holes 515 can prevent certain particles, objects, or matter from passing through the holes 515 while allowing other particles objects or matter to pass through the holes 515. Accordingly, in various embodiments, the strainer portion 510 may be configured to allow particles, objects, or matter to selectively pass through the holes 515 and therefore confine certain particles, objects, or matter to the cavity lower portion 110L (FIG. 1). In further embodiments, the strainer portion 510 may be removable and interchangeable.

As the plunger assembly 115 moves further toward the bottom end 107, an increasing number of particles or other matter are strained by the strainer portion 510, and the number of particles per volume increases in the cavity lower portion 110L. Particles that are strained and incapable of passing through the holes 515 may be caught or held within the holes or held against the strainer portion 510 bottom end 512. As such particles accumulate, the holes 515 and strainer portion 510 may become clogged and movement of the plunger assembly 115 toward the bottom end 107 may become more difficult (i.e., require additional pressure or force be applied to the plunger assembly 115) or may be prevented altogether (i.e., the pressure or force required to further move the plunger assembly 115 toward the bottom end 107 is greater than the pressure or force that can be applied by the user).

Accordingly, in various embodiments, it may be desirable to dislodge particles caught in the holes 515 or against the bottom portion 512 of the strainer portion 510, or otherwise clear the area around the bottom portion 512 such that fluid and/or particles can more easily pass through the strainer portion 510, without the necessity of undue pressure or force being applied to the plunger assembly 115 by a user.

For example, while moving the plunger assembly 115 toward the bottom end 107 by pushing down on the shaft 120, the user may also rotate the scraper assembly 130 by turning the shaft 120 and/or the knob 125, which thereby rotates the scraper assembly 130 about the bottom portion 512 of the strainer portion 510. In various embodiments, the scraper assembly 130 may be configured to contact and be held against the bottom portion 512 such that the blades 310 scrape the bottom portion 512 and scrape, wipe or otherwise remove particles from the bottom portion 512. Such rotation may also dislodge particles that are disposed within the holes 515.

In some embodiments it may be desirable to bias the scraper assembly 130 against the bottom portion 512 of the strainer portion 510. For example, the tensioner 335 of the axle assembly 365 may bias the scraper assembly 130 against the bottom portion 512 by applying an opposing force between the washer 330 that rests against the strainer body 305 and retainer 340 that is fixed to the shaft 120. Additionally, in further embodiments, it may be desirable to bias the scraper assembly 130 against the bottom portion 512 so that the scraper assembly 130 is operable to move over particles that are stuck in the bottom portion 512 (by coming away from the bottom portion 512), so that the scraper assembly 130 can maintain the ability to rotate about the bottom portion 512, even when particles are immovably stuck in the bottom portion 512 and obstruct the blades 310.

As the plunger assembly 115 moves further toward the bottom end 107, a larger volume of the beverage may be generated in the upper cavity portion 110U (FIG. 1) that is substantially free of the particles that are strained and confined in the cavity lower portion 110L by the strainer portion 510. In various embodiments, the plunger assembly 115 may be of a suitable size or diameter such that particles, objects, or matter of the beverage are substantially prevented from moving around the edges of the plunger assembly 115 between the upper and lower cavity portion 110U, 110L. Accordingly, the plunger assembly 115 and gasket 315 may be sized to correspond to the walls of the cavity 110 and provide a seal therewith.

For example, when preparing a fruit smoothie that includes berries and other fruits that comprise seeds, such seeds are typically not broken up or liquefied when the smoothie is processed in a blender. The seeds therefore remain suspended in the smoothie, which may be undesirable to a user. Accordingly, in various embodiments, the blended smoothie with seeds may be introduced to the cavity 110 and a plunger assembly 115 of a suitable configuration may be used to substantially strain the seeds and thereby confine the seeds in the cavity lower portion 110L, which creates a volume of smoothie that is seed-free and more desirable for a user.

Accordingly, in various embodiments the gasket 315 may be configured to generate a seal with the internal wall of the cavity 110 such that undesirable particles are unable to pass around the gasket 315 and contaminate the strained liquid in the upper portion 110U. Additionally, in some embodiments it may be desirable for the gasket 315 to generate sufficient friction with the internal walls of the cavity 110 such that a user can rotate the scraper assembly 130 without the gasket 315 rotating against the internal wall of the cavity 110, while also not providing so much friction such that a user is unable to comfortably depress the plunger assembly 130 by hand.

Returning to the method 600 of FIG. 6, in block 640, a portion of the beverage is removed from the upper portion 110U of the cavity 110 that is substantially absent of a portion of the particles, and the method is done at 699. Referring to the smoothie example above, the user can drink the substantially seed-free smoothie that resides in the cavity upper portion 110U. For example, the user can drink from the top portion 106 of the container body 105 or may drink from the lid orifice 245 where a lid 205 is coupled to the top of the container body 105. In further embodiments, the user may pour the substantially seed-free smoothie into another container.

While the present disclosure focuses on a kitchen-top or hand-held strainer 100, in various embodiments, a strainer 100 may be any suitable size. For example, in some embodiments, a strainer 100 may be smaller than the kitchen-top or hand-held strainer 100 shown and described herein. In further embodiments, a strainer 100 may be any suitable size larger than the kitchen-top or hand-held strainer 100 shown and described herein. For example, in various embodiments, a container 105 may hold 0.5 gallons, 1 gallon, 5 gallons, 20 gallons, 50 gallons, 100 gallons, 1000 gallons, 10,000 gallons or the like, without limitation. Some embodiments may include a container 105 with a closed bottom end 107; however, other embodiments may include a removable bottom end 107 or a bottom end that comprises a release valve, spigot, or the like.

Additionally, while the present disclosure focuses on a kitchen-top or hand-held strainer 100 for beverages (e.g., smoothies), in some embodiments, a strainer 100 may be used for straining any suitable mixture of solids and liquids and/or fluids. Such mixtures may be of any suitable temperature including hot or cold mixtures. For example, in some embodiments, a strainer 100 may be configured for use in beer brewing or winemaking applications, or the like. In further embodiments, a strainer 100 may be configured for use in a water treatment plant, or the like.

In various embodiments, a strainer 100 may provide for multi-stage or multi-layered straining of mixtures. For example, some embodiments include two or more stacked plunger assemblies 115 stacked in series at the bottom end 121 of the shaft 120. The strainer portions 510 may be similarly sized or may be of different sizes. For example, it may be desirable for the bottom-most strainer portion 510 of a stack to be configured for straining the coarsest particles, and for the top-most strainer portion 510 to be configured for straining the least coarse particles or finer particles than lower straining portions 510. Accordingly, in such embodiments, such successive straining may provide for the improved straining of liquids having particles of various sizes. In some embodiments, there may be scraper assemblies 130 associated with each of the bottom ends 512 of each of the plunger assemblies 115; however, in some embodiments, there may be fewer scraper assemblies 130 than strainer portions 510.

Furthermore, while the present disclosure focuses on a hand-actuated strainer 100, in various embodiments, any suitable portion of a strainer 100 may be automated, motorized, or computer controlled. For example, rotation of the scraper assembly 130 or movement of the plunger assembly 115 may be motorized, automated or computer controlled in various embodiments.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A system for preparing beverages comprising:
   a container defining a container cavity having a cavity top and bottom end; and
   a plunger assembly configured to translate within the container cavity between the cavity top and bottom end, the plunger assembly including:
      a shaft having a shaft top and bottom end;
      a straining body disposed at the shaft bottom end and having a strainer top and bottom end and a strainer bottom surface;
      a scraper assembly rotatably coupled about the strainer bottom end and configured to contact and rotatably scrape the strainer bottom surface; and
   a lid configured to couple about the cavity top end to generate a seal between the container and the lid
   wherein the lid further comprises:
      a lid orifice defined by the lid that provides a passage into the container cavity when the lid is coupled about the cavity top; and
      a shaft passage defined by the lid, through which the shaft extends and is operable to translate; and
   the scraper assembly defines a concave triangular shaped scraper with a hub, plural blades extending from the hub with each blade being wider near the hub than at the end of the blades; and
   wherein the strainer body defines a gasket seat about a circumference of the strainer body, and wherein a plunger gasket is disposed within the gasket seat.

2. The system for preparing beverages of claim 1, further comprising a lid cavity defined by a top rim, the shaft and lid orifice disposed within the lid cavity.

3. The system for preparing beverages of claim 1, wherein the strainer body comprises:
   a discrete strainer support; and
   a discrete strainer plate that defines a plurality of strainer holes.

4. The system for preparing beverages of claim 1, wherein an outer circumference of the plunger gasket corresponds to an internal circumference of the container cavity and wherein the plunger gasket is configured to define a movable seal with an internal surface of the container that defines the container cavity.

5. The system for preparing beverages of claim 1, wherein the scraper assembly comprises a plurality of blades that extend from a central hub.

6. The system for preparing beverages of claim 1, wherein the scraper assembly is biased against the strainer bottom surface.

7. The system for preparing beverages of claim 1, wherein the scraper assembly is biased against the strainer bottom surface by an axle assembly having a biasing tensioner.

8. The system for preparing beverages of claim 1, wherein the plunger assembly further comprises an axle assembly comprising:
   a bearing,
   wherein the bearing resides within a bearing slot defined by a portion of the strainer body,
   wherein the shaft bottom end extends through a bearing passage defined by the bearing and couples with the scraper assembly at a hub coupling via complementary threads.

9. The system for preparing beverages of claim 8, wherein the bearing comprises a rim.

10. The system for preparing beverages of claim 1, further comprising a loop.

11. The system for preparing beverages of claim 10, wherein the loop is disposed on a bottom portion of the lid.

12. The system for preparing beverages of claim 1, wherein the scraper assembly comprises one or more of blades configured to rotatably scrape the strainer bottom surface.

13. The system for preparing beverages of claim 1, wherein the scraper assembly comprises a plurality of blades that extend radially from a hub and that are configured to rotatably scrape the strainer bottom surface and dislodge particles that are disposed within holes defined by the bottom surface.

14. A system for preparing beverages comprising:
- a container defining a container cavity having a cavity top and bottom end; and
- a plunger assembly configured to translate within the container cavity between the cavity top and bottom end, the plunger assembly including:
  - a shaft having a shaft top and bottom end;
  - a straining body disposed at the shaft bottom end and having a strainer top and bottom end and a strainer bottom surface;
  - a scraper assembly rotatably coupled about the strainer bottom end and configured to rotatably scrape the strainer bottom surface, and
  - an axle assembly comprising:
    - a bearing,
    - a washer,
    - a tensioner, and
    - a retainer,
- wherein the bearing resides within a bearing slot defined by a portion of the strainer body,
- wherein the shaft bottom end extends through a bearing passage defined by the bearing and couples with the scraper assembly at a hub coupling via complementary threads;
- wherein the washer resides over the bearing,
- wherein the tensioner resides over the washer and
- wherein the retainer couples with the shaft via a retainer notch.

* * * * *